(12) United States Patent
Lippman et al.

(10) Patent No.: US 8,810,383 B2
(45) Date of Patent: Aug. 19, 2014

(54) SYSTEM AND METHOD FOR CONTROLLING ADAPTIVE CRUISE CONTROL BASED ON DRIVER STATUS

(75) Inventors: Mark Allan Lippman, New Baltimore, MI (US); Jerry H. Engelman, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 13/572,879

(22) Filed: Aug. 13, 2012

(65) Prior Publication Data

US 2014/0043152 A1    Feb. 13, 2014

(51) Int. Cl.
 *B60Q 1/00*     (2006.01)
(52) U.S. Cl.
 USPC . 340/438; 340/439; 340/426.11; 340/426.17; 340/5.61; 340/455
(58) Field of Classification Search
 USPC .............. 340/438, 439, 426.11, 426.17, 5.61, 340/455
 See application file for complete search history.

(56) References Cited

U.S. PATENT DOCUMENTS

| | | | |
|---|---|---|---|
| 5,454,442 A | 10/1995 | Labuhn et al. | |
| 6,556,905 B1 | 4/2003 | Mittelsteadt et al. | |
| 6,678,603 B2 | 1/2004 | Egawa et al. | |
| 6,708,099 B2 | 3/2004 | Tellis et al. | |
| 7,075,409 B2 * | 7/2006 | Guba | 340/5.21 |
| 7,757,803 B2 * | 7/2010 | Fiske et al. | 180/271 |
| 8,487,743 B2 * | 7/2013 | Proefke et al. | 340/5.72 |
| 2005/0216169 A1 | 9/2005 | Arai | |
| 2010/0198478 A1 | 8/2010 | Shin | |
| 2011/0082625 A1 | 4/2011 | Miller et al. | |

* cited by examiner

*Primary Examiner* — Tai T Nguyen
(74) *Attorney, Agent, or Firm* — Frank A. MacKenzie; Brooks Kushman P.C.

(57) ABSTRACT

A device for controlling an adaptive cruise control system based on driver status is provided. The device comprises a controller configured to receive at least one driver status signal indicative of the driver being either a primary driver or a secondary driver and to determine whether the driver of the vehicle is the one of the primary driver and the secondary driver based on the at least one driver status signal. The controller is further configured to allow control by a primary driver over operating parameters of an ACC system and to allow the primary driver to establish a restricted mode in which a secondary driver is prevented from making certain dis-allowed changes in the operating parameters.

10 Claims, 8 Drawing Sheets

SYSTEM AND METHOD FOR CONTROLLING ADAPTIVE CRUISE CONTROL BASED ON DRIVER STATUS

TECHNICAL FIELD

The embodiments described herein generally relate to a system and method for controlling the operation of an adaptive cruise control system between primary and secondary drivers.

BACKGROUND

With conventional automotive vehicles, one or more keys are often shared between any number of drivers. For example, the parents of a teenager (or young adult) that is old enough to drive may share the keys for the vehicle with the teenager. The vehicle may be equipped with various safety and/or driver notification features that may be enabled/disabled via a user interface based on the driver's needs. However, in some circumstances, the parent may not wish to have the various safety-related features disabled or altered by the teenager. The parent may enable the safety features and select desired settings prior to allowing the teenager to drive the vehicle, however there is no guarantee that the teenager will keep the safety features enabled and using the same settings while driving the vehicle. Conventional vehicles fail to give parents, or other such primary drivers, the option of preventing teenagers eligible to drive or other such secondary drivers from disabling or altering the settings of safety features.

U.S. Pat. No. US 8,258,939, issued on Sep. 4, 2012, is co-owned by the owner of the present patent application and teaches a device for controlling one or more vehicle features for a primary driver and a secondary driver. The device comprises a controller receiving a driver status signal from an ignition key device, the driver status signal indicative of the driver being either a primary driver or a secondary driver. The controller controls one or more vehicle features and prevent the vehicle features from being disabled when the driver status signal indicates that the driver of the vehicle is a secondary driver. Example safety-related vehicle features that are controlled in this way include Forward Collision Warning, Lane Departure Warning, and Electronic Stability Control.

Adaptive Cruise Control (ACC) systems use an on-board sensor (usually radar or lidar) to detect the distance between the host vehicle and a vehicle ahead of the host (the lead vehicle) and the relative speed difference between the vehicles. The system then automatically adjusts the speed of the host vehicle to keep it at a pre-set distance behind the lead vehicle, even in most fog and rain conditions. Typically, the host vehicle driver can set a desired/minimum following distance and/or a time gap to be maintained between vehicles. The ACC generates automatic interventions in the powertrain and/or braking systems of the host vehicle to slow the vehicle as necessary to maintain the selected minimum following distance. Some ACC systems also generate a driver alert or warning (usually audible), and the driver may be able to select the time prior to reaching the minimum following distance that the warning will be generated, typically in the range of approximately 1 to 3 seconds Some ACC systems also can determine how fast the host vehicle is approaching the lead vehicle. For example, when approaching a lead vehicle at a high rate of speed, the system will activate sooner than when approaching slower.

SUMMARY

In at least one embodiment, a device for controlling an adaptive cruise control system based on driver status is provided. The device comprises at least one controller configured to receive at least one driver status signal indicative of the driver being either a primary driver or a secondary driver and to determine whether the driver of the vehicle is the one of the primary driver and the secondary driver based on the at least one driver status signal. The at least one controller is further configured to allow control by a primary driver over operating parameters of an ACC system and to allow the primary driver to establish a restricted mode in which a secondary driver is prevented from making certain dis-allowed changes in the operating parameters.

DETAILED DESCRIPTION

Figure 1:
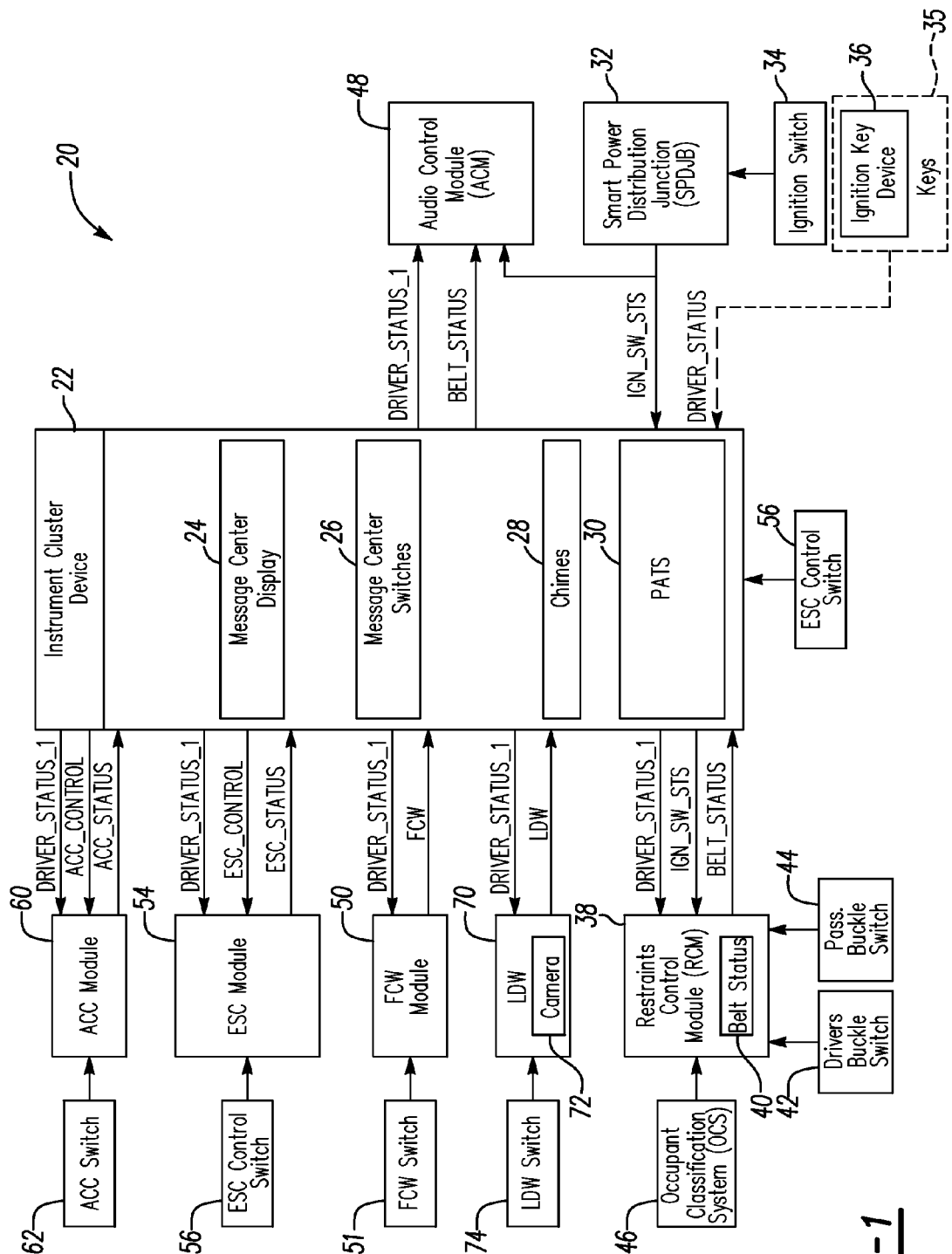
FIG. 1 depicts a system for differentiating between primary and secondary drivers of a vehicle and for controlling the operation of various safety and notification features based on the status of the driver in accordance to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present invention generally provides for a driver identification functional operation whereby primary and secondary drivers are determined and various levels of control are granted to the driver based on whether the driver is the primary driver or the secondary driver. Any number of individuals may be a primary driver so, under some circumstances, the primary driver may be considered a group. Similarly, any number of individuals may be a secondary driver, so the secondary driver may be considered a group.

In general, the primary driver may be defined as the administrative driver who has greater control over the functionality of one or more vehicle features. Such vehicle features may relate to safety and/or notification features in the vehicle. Examples of primary drivers may include, but not limited to, a parent, an employer (or agent of the employer who has management authority over employees who use vehicles provided by the employer for purposes of performing a particular function/job), agent of a rental car agency, owner of a vehicle that uses a valet service. The secondary driver may be defined as a restricted driver who has limited control over the various vehicle features and is to abide by the functional restrictions imposed or selected by the vehicle or the primary driver (i.e., the vehicle features are not to be disabled, and/or settings or parameters of the vehicle features are not to be changed by the secondary driver). Examples of secondary drivers may include, but not limited to, a novice driver (e.g., a teenager), an employee (i.e., person under the control of an employer or agent of the employer), consumers who purchase rental car services, or a valet.

The embodiments of the present invention provide a method and apparatus for allowing a primary driver to establish a restricted ACC operating when the vehicle is operated by a secondary driver. In the restricted mode, a secondary driver is limited in the types and/or ranges of adjustments that may be made to operating parameters of the ACC.

The embodiments of the present invention as set forth herein generally illustrate and describe a plurality of controllers (or modules), or other such electrically-based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

FIG. 1 depicts a system 20 for differentiating between the primary and secondary drivers of the vehicle and for controlling the operation of various safety and notification features based on the status of the driver. The system 20 generally comprises an instrument cluster controller 22. The instrument cluster controller 22 (or cluster) includes a message center display 24. The message center display 24 displays various information such as the various states of vehicle functionality to the driver. For example, the message center display 24 may display a driver identification message during vehicle start-up, various administrative menu options, a seatbelt warning message, a speed limit start-up message, vehicle near top speed message, top speed message, driver identification speed warnings, an Electronic Stability Control (ESC) message, a Forward Collision Warning (FCW), a Land Departure LDW message, and an ACC message.

The cluster 22 also includes a plurality of message center switches 26 and chimes 28. The driver may toggle the message center switches 26 to view different messages and/or respond to various prompts directed to the driver by the vehicle. The chimes 28 may audibly notify the driver when predetermined vehicle conditions have been met. In one example, the cluster 22 may activate the chimes 28 when the vehicle is near a top speed, the vehicle has achieved a top speed, the vehicle has exceeded the top speed, there is a low level of fuel in the fuel tank, and/or when the TC is enabled. It is recognized that the display 24, switches 26, and/or chimes 28 may be packaged in any number of locations in the vehicle other than the cluster 22.

The cluster 22 may include a passive anti-theft security (PATS) controller 30. While FIG. 1 generally illustrates that the PATS controller 30 is positioned within the cluster 22, other implementations may include the PATS controller 30 being implemented as a standalone controller and positioned external to the cluster 22. A smart power distribution junction box (SPDJB) controller 32 may be operably coupled to the cluster 22. The cluster 22 and the SPDJB controller 32 may communicate with each via a communication bus. In general, all of the signals transmitted to/from the cluster 22 may be transmitted via the communication bus. The communication bus may be implemented as a High/Medium Speed Controller Area Network (CAN) bus or a Local Interconnect Network (LIN). The particular type of communication bus used may be varied to meet the desired criteria of a particular implementation. The SPDJB controller 32 may include a plurality of fuses, relays, and various micro-controllers for performing any number of functions related to the operation of interior and/or exterior electrically based functionality of the vehicle. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 34 may be operably coupled to the SPDJB controller 32. The SPDJB controller 32 may receive hardwired signals indicative of the position of the ignition switch 34 and transmit messages on the communication bus that are indicative of the position of the ignition switch. For example, the SPDJB controller 32 may transmit a signal IGN_SW_STS over the communication bus to the cluster 22. The SPDJB controller 32 may transmit the signal IGN_SW_STS to any controller coupled to the communication bus that may need key ignition status as an input to perform a particular function.

The ignition switch 34 may receive one or more keys 35 to start the vehicle. The keys 35 may be tagged or associated with the primary driver and the secondary driver of the vehicle. The keys 35 may be of the more traditional type having a metal portion that must be inserted into mating engagement with a switch and turned, or they may be part of a "keyless" system that use wireless technology to enable a push-button start when within a required distance of a vehicle-mounted receiver. The key 35 includes an ignition key device 36 embedded therein for communicating with the vehicle. The ignition key device 36 comprises a transponder (not shown) having an integrated circuit and an antenna. The transponder is adapted to transmit an electronic code as a signal DRIVER_STATUS to the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag which corresponds to hexadecimal-based data. The PATS controller 30 determines if the hex data in the RFID tag matches predetermined hex data stored therein (e.g., in a look up table of the PATS controller 30) prior to allowing the vehicle to start for anti-theft purposes. In the event the RFID tag matches the predetermined hex data, an engine controller operably coupled to the PATS controller 30 allows the vehicle to start the engine. In general, the vehicle assembly plant, supplier facility (e.g., manufacturer of the keys and/or PATS controller 30), or car dealership performs the operation of learning the RFID tag of the keys 35 to the vehicle prior to delivery the vehicle to the end user.

The PATS controller 30 may also use the signal DRIVER_STATUS for purposes of identifying whether the driver of the vehicle is the primary driver or the secondary driver. For example, the PATS controller 30 may transmit a signal DRIVER_STATUS_1 to indicate whether the particular driver is the primary driver or the secondary driver to various vehicle controllers or modules as either message data on the communication bus or hardwired signals. Prior to the PATS controller 30 transmitting the signal DRIVER_STATUS_1, the primary and secondary keys must be learned to the PATS controller 30.

The system 20 may employ different operations for associating the keys 35 to the primary and secondary drivers. In one implementation, the PATS controller 30 may employ a sequential based operation for associating the keys 35 to the primary and secondary drivers. For example, during the learn operation whereby the RFID tag for a particular key is learned to the vehicle to support the passive anti-theft function, the PATS controller 30 may assign priority status to the first key learned which in essence tags the first key as the primary key. The RFID tag of the first key learned to the vehicle may be assigned a higher status than the second key. The RFID tag of the second key when learned to the vehicle may be designated by the PATS controller 30 as the secondary key. The particular order with respect to when a key is assigned primary or secondary status may be varied to meet the designed criteria of a particular implementation. In addition, any number of spare keys may be tagged as being either primary or secondary. For example, any number of replacement or spare keys may be learned to the vehicle and designated as either a primary or a secondary key. This allows the creation of a primary driver group and a secondary driver group. After the PATS controller 30 tags the keys 35 as either primary or secondary keys, the PATS controller 30 sends the signal DRIVER_STATUS_1 over the bus to indicate whether the driver of the vehicle is the primary or secondary driver. The tag operation may be performed simultaneously with the process of learning the keys 35 to the PATS controller 30 for passive anti-theft purposes.

In another implementation, the PATS controller 30 may add additional data to the RFID tag to correspond to whether the driver of the vehicle is the primary or the secondary driver. The RFID tag may include a byte which includes predetermined hex values that corresponds to whether the driver of the vehicle is the primary or secondary driver. For example, the byte may include the value "FE" which corresponds to the primary driver. The PATS controller 30 upon receiving the RFID tag with the "FE" value may recognize the particular key as a primary key and determine that the status of the driver is the primary driver. The byte may also include the value "FF" in the place of "FE" which corresponds to the secondary driver. The PATS controller 30 upon receiving the RFID tag with the value "FF" may recognize the particular key as a secondary key and determine that the status of the driver is the secondary driver. It should be noted that the hex bytes "FE" and "FF" are used for illustrative purposes. The particular type of hex data and the length of data used to correspond to the primary and secondary drivers may vary based on the desired criteria of a particular implementation.

A restraint control module (RCM) 38 may be operably coupled to the cluster 22 via the communication bus. The RCM 38 may deploy various safety restraint systems in response to the vehicle experiencing impact with an object. For example, the restraint control module 38 may deploy one or more airbags positioned about the vehicle, motorized pretensioners, and/or seat controls to reduce the risk of injury to vehicle occupants in the event the vehicle experiences an impact. A seatbelt status controller 40 may be operably coupled to the restraints control module 38. While FIG. 1 generally illustrates that the seatbelt status controller 40 is positioned within the RCM 38, additional configurations may include positioning the seatbelt status controller 40 out of the RCM 38. The seatbelt status controller 40 is generally adapted to notify the driver that one or more seatbelts in the vehicle have not been fastened or are in an unbuckled state. The seatbelt status operation controller is disclosed in U.S. Pat. No. 6,278,358 to Spoto et al.; U.S. Pat. No. 6,362,734 to McQuade et al.; and U.S. Pat. No. 6,501,374 to King et al. which are assigned to the assignee of the present invention and are hereby incorporated by reference in their entirety.

A driver's buckle switch 42 is coupled to the seatbelt status controller 40 and generally presents data indicative of whether the driver's seatbelt is fastened to the driver. A passenger buckle switch 44 is also coupled to the seatbelt status controller 40 and generally presents data indicative of whether the passenger's seatbelt is fastened. An occupant classification system 46 may be optionally coupled to the seatbelt status controller 40 for providing information with respect to the position of the occupants in the vehicle. The seatbelt status controller 40 may use such information provided by the occupant classification system 46 to determine which seat is occupied by an occupant. Based on vehicle occupant location, the seatbelt status controller 40 may have knowledge with respect to which seatbelts may need to be monitored by the seatbelt status controller 40.

In general, the seatbelt status controller 40 is generally adapted to audibly and visually notify the occupant in the vehicle that one or more of the seatbelts are not fastened when the ignition is in the run position and the vehicle speed is above a predetermined speed threshold. In addition, the seatbelt status controller 40 may be deactivated if at any time the seatbelt is fastened (or buckled), or after the seatbelt status controller 40 has audibly and visually notified the occupant for a predetermined amount of time (e.g., five minutes). The seatbelt status controller 40 includes a chime (not shown) for audibly notifying the driver in the event one or more of the seatbelts are not fastened, the vehicle speed has reached and/or exceeded the predetermined vehicle speed threshold, and the position of the ignition switch 34 is in run. The seatbelt status controller 40 may transmit a signal BLT_STS over the communication bus to the cluster 22 so that the cluster 22 visually notifies the driver via the message center display 24 or with a telltale indicator that one or more of the seatbelts are not fastened (or buckled). The telltale is generally defined as a indicator positioned in the cluster 22 which includes a symbol (e.g., engine, seatbelt, low fuel, charge status of battery, etc.) positioned thereon and configured to illuminate when predetermined conditions related to each of the engine, seatbelt, low fuel, and low battery charge have been met. The signal BLT_STS generally corresponds to a restraint status signal in which one or more of the seatbelts may be unfastened or in an unbuckled state and the vehicle speed and the ignition status conditions have been met. In one example, the seatbelt status controller 40 may transmit an intermittent chime at 240 rep/min at a frequency of 740 Hz. The number or repetitions per minute and the frequency of the chime may vary based on the desired characteristics of a particular implementation.

The cluster 22 transmits the signal IGN_SW_STS to the seatbelt status controller 40 so that the seatbelt status controller 40 may assess the status of the ignition switch 34 (e.g., OFF, RUN, ACCY or START). An audio control module (ACM) 48 may be operably coupled to the cluster 22 via the communication bus. The ACM 48 is adapted to generate audible signals for entertainment purposes. The ACM 48 may also be adapted to amplify voice commands in the event a cell phone is coupled to the ACM 48. In addition, the ACM 48 may be used in combination with a voice recognition session. The ACM 48 ceases to generate audible signals in response to the seatbelt status controller 40 determining that one or more seatbelts are not fastened, and the vehicle speed and ignition status conditions are met. The ACM 48 performs the mute operation in response to receiving the signal BLT_STATUS. The ACM 48 may not be in a muted state when used to facilitate a cell phone conversation or when used in connection with a voice recognition session in the event the seatbelts are disabled and the applicable vehicle criteria is met.

Conventional vehicles generally provide drivers with the ability to enable or disable the seatbelt status controller 40 in order to turn off/on the controller 40 as desired by the driver. By disabling the controller 40, the controller 40 may cease to audibly notify the driver and cease to transmit the signal BLT_STATUS to the cluster 22 for visually notifying the driver that the seatbelts are in unbuckled state. The system 20 provides the primary driver with the option of selectively enabling/disabling the operation of the controller 40, however, the system 20 may prevent the secondary driver from disabling the operation of the seatbelt status controller 40. The controller 40 receives the signal DRIVER_STATUS_1 to determine whether the driver is the primary driver or the secondary driver. The seatbelt status controller 40 is generally configured "ON" and provides audible notification and the cluster 22 is configured to visually present the safety belt unfastened message when the applicable vehicle criteria is met and in response to determining that the secondary driver is driving the vehicle. The functionality performed by the seatbelt status controller 40 may be incorporated into the cluster 22 or the SPDJB 32.

In one example, the cluster 22 may visually present the option of enabling/disabling the seatbelt status option via the message center display 24 and allow the primary driver to select a corresponding option via the message center switches 26. In such an example, the cluster 22 may transmit a control signal (not shown) to the seatbelt status controller 40 to enable/disable the seatbelt status operation. The cluster 22 on the other hand may not visually present such an option to the secondary driver in response to detecting that the driver of the vehicle is the secondary driver. In the event the driver of the vehicle is the secondary driver, the ACM 48 is muted in response to determining that the secondary driver is not fastened with a seatbelt and the applicable vehicle criteria is met. The muted characteristic of the ACM 48 may not be enabled/disabled by the secondary driver.

A forward collision warning (FCW) module 50 may be operably coupled to the cluster 22 and receive the signal DRIVER_STATUS_1 from the cluster 22. The FCW module 50 may be a portion of an active sensing system that is adapted to determine if the vehicle is in a state in which a frontal collision may be imminent. In such a case, the FCW module 50 may transmit a signal FCW to the cluster 22 in the event a forward collision is imminent. The FCW system generally includes a heads up display (HUD) which includes a bank of LEDs. The bank of LEDs is disposed about the windshield of the vehicle. The FCW module 50 is operably coupled to a radar system (not shown). The radar system detects the position of the object with respect to the vehicle. In the event an imminent collision is detected by the radar system, the radar system transmits a control signal (not shown) to the FCW module 50. The FCW module 50 illuminates the bank of LEDs to notify the occupants that a collision may be imminent. The FCW module 50 generally allows the driver to enable/disable the chime and/or the visual indicators as well as to adjust a particular sensitivity level.

The cluster 22 may also audibly and visually notify (via the message center display 24 (or telltale) and the chimes 28) the driver of the collision when the collision is imminent. An FCW switch 51 may be coupled to the FCW module 50 to enable/disable the FCW module 50 and control vehicle sensitivity. In addition the FCW feature may be enabled/disabled by the primary driver via the message center switches 26 in the cluster 22. In such an example, the cluster 22 may transmit a control signal (not shown) to the FCW module 50 to enable/disable the FCW feature. The primary driver is generally permitted to enable/disable the chime and/or visual indicator and adjust the sensitivity level of the FCW system. The secondary driver is prohibited from disabling the FCW feature in the event the secondary driver is detected to be the driver of the vehicle. For example, the cluster 22 may not present the enable/disable prompt to the secondary driver via the cluster 22 to allow the secondary driver to disable FCW. The cluster 22 is configured to allow the secondary driver to adjust vehicle sensitivity for determining the particular moment in which the FCW warning is to be issued. The secondary driver may increase/decrease sensitivity to trigger the FCW earlier/later based on the selected sensitivity level. The secondary driver is prohibited from enabling/disabling the visual and/or audible warning mechanism of the FCW.

An ACC module 60 may be operably coupled to the cluster 22. The ACC module 60 is adapted to control the operation of the adaptive cruise control (ACC) systems, allowing the system to be enabled/disabled (ON/OFF) as well as setting other operating parameters of the system. Besides ON/OFF, operating parameters of the ACC that may be selected or adjusted by a driver may include the minimum following distance (MFD) that will be monitored and/or enforced; a choice between an Alert Only Mode in which an alert (usually audible) is generated when the MFD is (or is about to be) violated; and an Auto Distance Maintain Mode in which automatic interventions in the powertrain and/or brake system are generated. Other operating parameters may include a minimum activation speed (MAS) above which the MFD will be enforced; and an alert time interval (ATI), the time period prior to reaching the minimum following distance (in the absence of a control intervention) that the alert will be generated.

An ACC control switch 62 may be operably coupled directly to the ACC module 60 or directly to the cluster 22. The ACC control switch 62 generally allows the driver the ability to enable/disable ACC operation and to set other operating parameters as necessary. The ACC module 60 is configured to present a signal ACC_STATUS to the cluster 22 so that the cluster 22 can display the current state of ACC systems (e.g., selected MFD, Alert Only Mode versus Auto Distance Maintain Mode, selected MAS, selected ATI). In the event the ACC control switch 62 is coupled to the cluster 22, the cluster 22 transmits a signal ACC_CONTROL to the ACC module 60 to enable/disable/adjuct the ACC operations. The message center switch 26 may also be used by the driver to enable/disable/adjust the ACC operation without the need for the ACC switch 62. In such a case, the cluster 22 transmits the signal ACC_CONTROL to the ACC module 60 to enable/disable/adjust the ACC operation.

The ACC module 60 is adapted to receive the signal DRIVER_STATUS from the cluster 22 to determine if the driver of the vehicle is the primary or the secondary driver. The ACC module 60 is configured to allow the primary driver to place the ACC system into a restricted mode in which the secondary driver is prevented or limited in the adjustment that may be made to any one or more of the ACC operating parameters. For example, the primary driver may establish the restricted mode such the secondary driver is prevented from disabling the Auto Distance Maintain Mode and from adjusting the MFD to below a certain minimum distance. As another example, the restricted mode may be established by the primary driver such that the secondary driver is allowed to disable the Auto Distance Maintain Mode, but the secondary driver is unable to disable the Alert Only Mode and unable to adjust the ATI to below a certain minimum time. In the event the driver of the vehicle is the secondary driver, the cluster 22 may not present a message in the message center display 24 to the secondary driver to allow the secondary driver to make the selections and/or adjustments to the ACC operating parameters that have been selected by the primary driver. In the event the secondary driver attempts to adjust any one or more of the ACC operating parameters, the cluster 22 may display an ACC driver status message.

In the event the primary driver intends to allow the secondary driver full control over the ACC operating parameters, the primary driver may simply choose not to select the restricted mode option with the message center switches 26. No action is required by the primary driver in this case. In the event the primary driver intends to restrict operation of the ACC feature for the secondary driver (e.g., prevent the secondary driver from disabling the feature or reducing the MFD to too short a distance), the primary driver may select the restricted mode setting via the message control switches 26 and select the particular operating mode changes that are to be unavailable to the secondary driver. The cluster 22 may transmit the signal ACC_CONTROL to the ACC module 60 (e.g., if the ACC control switch 62 is coupled to the cluster 22) which is indicative of which of the operating parameters are available/unavailable to the secondary driver.

An ESC module 54 may be operably coupled to the cluster 22. The ESC module 54 is adapted to control the operation of various electronic stability control (ESC) systems, such as traction control (TC), yaw stability control (YSC) and rollover stability control (RSC). The ESC module 54 may include a TC controller (not shown), a YSC controller (not shown) and a RSC controller (not shown). The TC controller generally reduces power to drive wheels of the vehicle in order to minimize wheel-spin and maximize traction. The YSC controller generally controls the vehicle's motion of rotation about a vertical axis. The RSC controller generally controls the motion of the vehicle by selectively applying brakes and controlling the speed of the vehicle to prevent the vehicle from rolling over.

An ESC control switch 56 may be operably coupled directly to the ESC module 54 or directly to the cluster 22. The ESC control switch 56 generally allows the driver the ability to enable/disable the one or more ESC operations in the event one or more of the ESC operations are not needed. For example, the ESC control switch 56 may allow the driver the ability to disable the traction control system due to various road conditions, such as snow, dirt, ice, etc. The ESC module 54 is configured to present a signal ESC_STATUS to the cluster 22 so that the cluster 22 can display the current state of ESC systems (e.g., TC, YSC and RSC). In the event the ESC control switch 56 is coupled to the cluster 22, the cluster 22 transmits a signal ESC_CONTROL to the ESC module 54 to enable/disable the ESC operations. The message center switch 26 may also be used by the driver to enable/disable the ESC operation without the need for the ESC switch 56. In such a case, the cluster 22 transmits the signal ESC_CONTROL to the ESC module 54 to enable/disable the ESC operation.

The ESC module 54 is adapted to receive the signal DRIVER_STATUS from the cluster 22 to determine if the driver of the vehicle is the primary or the secondary driver. The ESC module 54 is configured to prevent the secondary driver from disabling any one or more of the ESC operations. For example, the primary driver may desire to prevent the secondary driver from disabling the traction control operation for safety reasons. Such a condition may prevent the secondary driver from spinning or burning the tires and/or drifting when the traction control is disabled. In the event the driver of the vehicle is the secondary driver, the cluster 22 may not present a message in the message center display 24 to the secondary driver to allow the secondary driver to disable the ESC operations. In the event the secondary driver attempts to disable any one or more of the ESC features, the cluster 22 may display an ESC driver status message.

The primary driver may allow the secondary driver to enable/disable the operation of the traction control in the event it may be likely that the secondary driver may experience road conditions that may require disabling traction control. For example, due to various weather conditions or road conditions, the primary driver may configure the ESC module 54 via the cluster 22 to allow the secondary driver to disable the traction control. For example, the message center display 24 may provide for an inhibit traction control message which allows the primary driver the option of either allowing the secondary driver the ability to enable/disable traction control or to inhibit enabling/disabling the traction control.

In the event the primary driver intends to allow the secondary driver to enable/disable the traction control, the primary driver may simply choose not to select the inhibit traction control option with the message center switches 26. No action is required by the primary driver in this case. In the event the primary driver intends to inhibit the traction control disable feature for the secondary driver (e.g., prevent the secondary driver from either enabling/disabling the traction control feature), the primary driver may select the inhibit feature via the message control switches 26 thereby precluding the secondary driver from enabling/disabling the traction control feature. The cluster 22 may transmit the signal ESC_CONTROL to the ESC module 54 (e.g., if the ESC control switch 56 is coupled to the cluster 22) which is indicative of whether the secondary driver can enable/disable the one or more ESC operations or whether the secondary driver is precluded from enabling/disabling the traction feature.

An LDW module 70 is operably coupled to the cluster 22. A forward pointing camera 72 is operably coupled to the LDW module 70. The LDW module 70 uses the forward pointing camera 72 to determine what side of the vehicle is deviating from a lane or crossing over the lane to issue a warning. The LDW module 70 transmits a signal LDW to the cluster 22 so that the device generates an audible and/or visual warning for the driver.

The LDW module 70 is configured to detect a shift in the driver's performance that may cause the vehicle to leave a lane or head off of the road. For example, the LDW module 70 may detect the vehicle's position with respect to road lane markings in order to detect a lane departure. The vehicle position is evaluated by measuring the lateral distance from generally the center of the camera 72 to the left and the right lane markings. Such a measurement is generally defined as a Driver's Impairment Monitor (DIMON) The LDW module 70 assigns a rating to DIMON. In general, the LDW module 70 monitors the DIMON to detect a shift in the driver's performance that may be attributed to the driver exhibiting a drowsy or sleepy condition. In the event the DIMON rating is high, the LDW module 70 may transmit the signal LDW to the cluster 22 so that the cluster 22 visually and/or audibly notifies the driver that the vehicle is veering off of the road at an early stage so that the driver can regain control of the vehicle prior to collision or other failure mode. Impairment may be inferred by detecting a change in variation (e.g., common cause variation vs. special cause variation).

The LDW feature may be adjusted to various sensitivity levels that are selected by the driver. The LDW operation may be sensitive (e.g., LDW module 70 generates warning early based on slight lane variation) or more tolerant (e.g., LDW module 70 generates warning based on greater lane variation). Such a condition is provided to account for different driving styles of the driver.

In one example, an LDW switch 74 may be coupled to the LDW module 70 and enable/disable the LDW feature. In another implementation, the driver may use the message center switches 26 to enable/disable the LDW feature. The operation of the LDW feature may be enabled/disabled based on the status of the driver. For example, the primary driver is free to enable/disable the operation of the LDW feature as desired (e.g., primary driver can select switches 26 on the cluster 22). On the other hand, the cluster 22 or the LDW module 70 prevents the secondary driver from disabling the LDW feature. In the event LDW switch 74 is used as a mechanism to enable/disable the LDW feature, the LDW module 70 receives the signal DRIVER_STATUS_1 from the cluster 22 to determine driver status. If the signal DRIVER_STATUS_1 indicates that the driver is the primary driver, then the LDW module 70 may enable/disable the LDW feature as desired via signals received from the LDW switch 74. If the signal DRIVER_STATUS_1 indicates that the driver is the secondary driver, then the LDW module 70 may not allow the secondary driver to enable/disable the LDW feature. In other words, the LDW module 70 forces the LDW feature on at all times in response to determining that the driver is the secondary driver. In this condition, the cluster 22 may notify the secondary driver that the LDW feature cannot be disabled to notify the secondary driver that the LDW switch 74 is functioning properly. In this implementation, the LDW module 70 may transmit a control signal in response to each detection of a signal input from the LDW switch 74 so that the cluster 22 can notify the secondary driver that the LDW switch 74 is functioning properly.

In another implementation, switches 26 on the cluster 22 may be used to control the LDW module 70 to enable/disable the LDW feature. In this implementation, the cluster 22 transmits a control signal (not shown) to the LDW module 70 to enable/disable the LDW feature (e.g., primary driver selects switches 26 and cluster 22 generates control signal in response thereto). In the event the cluster 22 determines that the driver is the secondary driver based on the signal DRIVER_STATUS, the cluster 22 inhibits the LDW disable option and prevents the secondary driver from viewing the enable/disable LDW feature in the message center display 24.

As noted above, the driver can select various sensitivity levels so that the LDW feature can be triggered at an early stage of the vehicle being detected to depart from the lane or at a later stage of the vehicle being detected to depart from the lane. In general, the driver may adjust the sensitivity to match his/her driving performance, which in turn may minimize false positives (or warnings). If the driver did not have the capability to adjust the sensitivity, and a number of false warnings are generated, then the driver may simply ignore the warnings. Such a selection may be made by the LDW switch 74 or by the switches 26 on the cluster 22.

Figure 2:
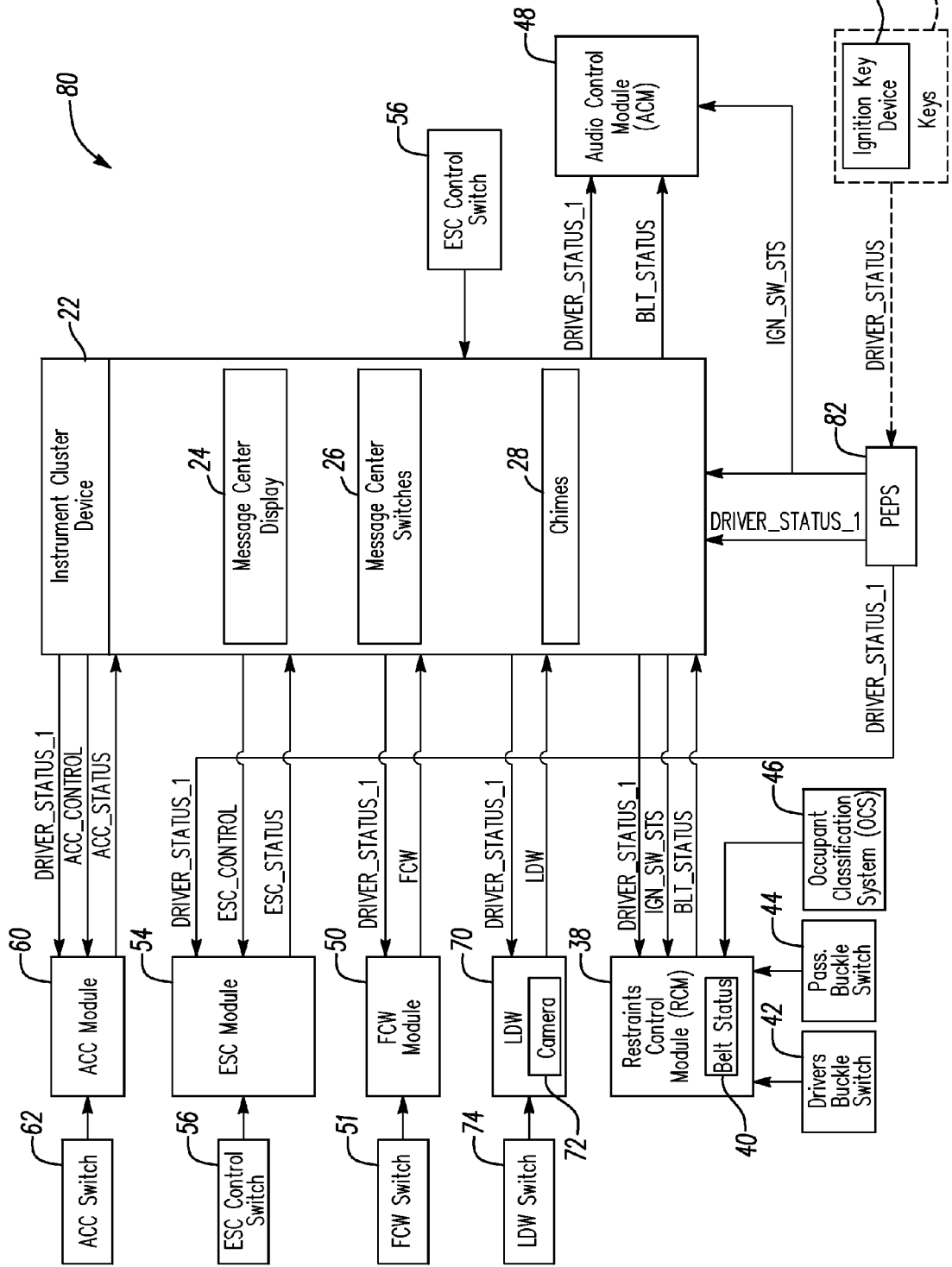
FIG. 2 depicts another system for differentiating between primary and secondary drivers of a vehicle and for controlling the operation of various safety and notification features based on the status of the driver in accordance to another embodiment of the present invention.

FIG. 2 depicts a system 80 for differentiating between primary and secondary drivers and for controlling the operation of various safety and notification features based on the status of the driver in accordance to another embodiment of the present invention. A passive entry passive start (PEPS) controller 82 may be operably coupled to the cluster 22. The PEPS controller 82 may be used in place of the PATS controller 30 as illustrated in FIG. 1. While FIG. 2 generally illustrates that the PEPS controller 82 is positioned external to the cluster 22, additional implementations may include positioning the PEPS controller 82 within the cluster 22. The particular placement of the PEPS controller 82 with respect to the cluster 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the RFID tags as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle of the vehicle. In response to the door handle being toggled or touched, the PEPS controller 82 may wake up and transmit RF based signals to the keys. The PEPS controller 82 and the keys 35' may undergo a series of communications back and forth to each other (e.g., handshaking) for vehicle access authentication purposes. The PEPS controller 82 may unlock the doors in response to a successful completion of the handshaking process. Once the driver is in the vehicle, the driver may simply press a button positioned on an instrument panel to start the vehicle.

The system 80 may be adapted to tag or associate the keys as either a primary or a secondary key during a learn operation as discussed with the PATS controller 30. As noted in connection with FIG. 1, while learning the keys to the vehicle during vehicle assembly or during repair, the keys 35' may be tagged as a primary key or a secondary key based on the sequential order in which the keys 35' are learned to the vehicle. For example, the PEPS controller 82 may assign the first key 84 that is learned to the vehicle as the primary key and the second key 84 that is learned to the vehicle as the secondary key. During vehicle startup, the keys 35' each transmit a corresponding RFID tag having hexidecimal-based data on the signal DRIVER_STATUS to the PEPS controller 82. The PEPS controller 82 may compare the hex data in the RFID tag to predetermined hex data in a lookup table of the PATS controller 30 to determine if a match occurs. If a match occurs, the PEPS controller 82 may allow the engine to start in the event the driver intends to start the vehicle.

In addition to the learn operation as discussed immediately above, the system 80 may tag or associate the keys by providing predetermined hex data in the RFID tag which corresponds to whether the key is a primary key or a secondary key as noted in connection with the PATS controller 30. The PEPS controller 82 receives the predetermined hex in the RFID tag and determines whether the key is a primary or a secondary key based on the predetermined hex data in the RFID tag.

Any number of additional keys may be tagged as either the primary or secondary key. For example, a plurality of replacement or spare keys may be learned to the vehicle and designated as either a primary or a secondary key. The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the cluster 22. The PEPS controller 82 determines that the key ignition status is in the run position in response to the driver toggling the brake pedal and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is contemplated that the keys may be implemented as a cell phone or other suitable device to gain entry into the vehicle or to start the vehicle. Such an electronic device may be associated to a particular person who can be classified as a primary driver and a secondary driver. In the event the keys are implemented as a cell phone, a receiver may receive data which can include information pertaining to driver identification which can be used to ascertain the identity of the driver. In another embodiment, the systems disclosed herein may include an auxiliary protocol interface module (APIM) (not shown). In one example, the APIM may be implemented as part of the SYNC system developed by Ford Motor Company and Microsoft®. The APIM may be wirelessly coupled to a cell phone that is used by the driver and may be adapted to identify the identity (e.g., primary or secondary driver) of the driver. For example, the driver may wirelessly link his/her cell phone to the APIM. In particular, the parent (or other administrative driver) can synchronize his/her cell phone to the APIM and designate this cell phone as belonging to the primary driver. The primary driver can then synchronize the cell phone belonging to the novice driver (or other secondary driver) to the APIM and designate as a secondary driver. Various prompts may be presented to the primary driver via the APIM when it is desired to link the cell phone(s) to the APIM. The APIM may transmit data over the bus indicating the identity of the driver (e.g., primary or secondary driver) to the cluster 22 or other module in the vehicle.

Figure 3:
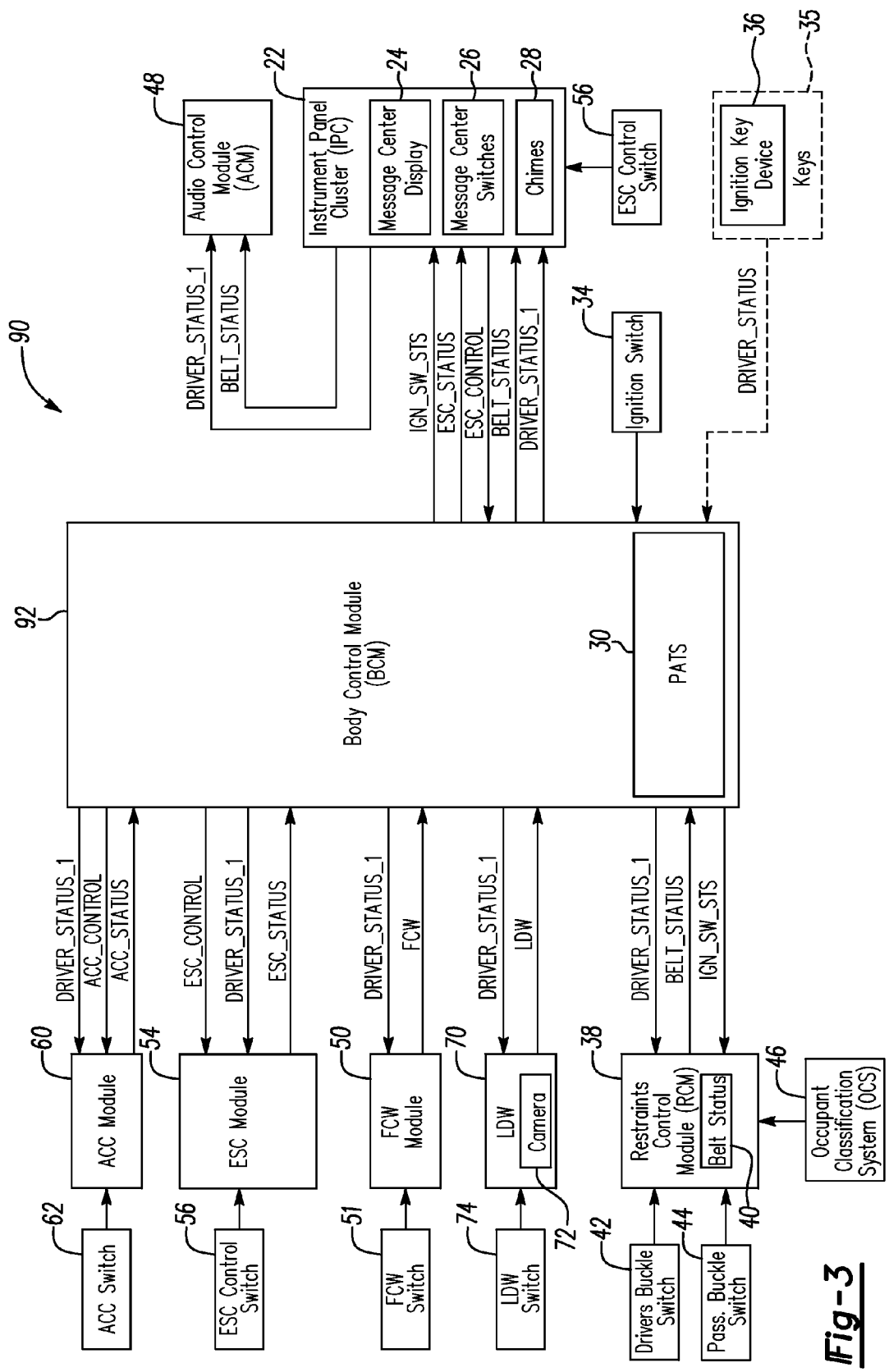
FIG. 3 depicts another system for differentiating between primary and secondary drivers of a vehicle and for controlling the operation of various safety and notification features based on the status of the driver in accordance to another embodiment of the present invention.

FIG. 3 depicts another system 90 for differentiating between primary and secondary drivers of a vehicle and for controlling the operation of various safety and notification features based on the status of the driver in accordance to another embodiment of the present invention. A body control module (BCM) 92 may be operably coupled to the cluster 22. The BCM 92 may be adapted to perform a number of interior body electrically based functions. For example, the BCM 92 may perform interior locking, remote keyless entry (RKE), interior/exterior lighting, wiper control (front and/or rear) and other such suitable functionality that is generally attributed to the interior electronics of the vehicle.

The PATS controller 30 may be positioned within the BCM 92. While FIG. 3 generally illustrates that the PATS controller 30 is positioned within the BCM 92, the PATS controller 30 may be positioned in the cluster 22 or any other controller or module shown in FIG. 3. In addition, the PATS controller 30 may be implemented as a standalone unit. The particular placement of the PATS controller 30 may be varied to meet the design criteria of a particular implementation. The PATS controller 30 may be coupled directly to the ignition switch 34. The BCM 92 may transmit the signal IGN_SW_STS to the cluster 22 via the communication bus. The BCM 92 may transmit and receive all signals as illustrated in FIG. 3 via the communication bus. Additionally, the cluster 22 may transmit and receive all signals as illustrated in FIG. 3 via the communication bus. The BCM 92 may be adapted to transmit the signal DRIVER_STATUS_1 to the cluster 22, the restraint control module 38, the seatbelt status controller 40, the audio control module 48, the ESC module 54, and/or the ACC module 60. The cluster 22 inhibits or restricts ACC operating parameter changes, FCW disable, LDW disable, and provides for the early low fuel warning (or low battery charge warning) in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 4:
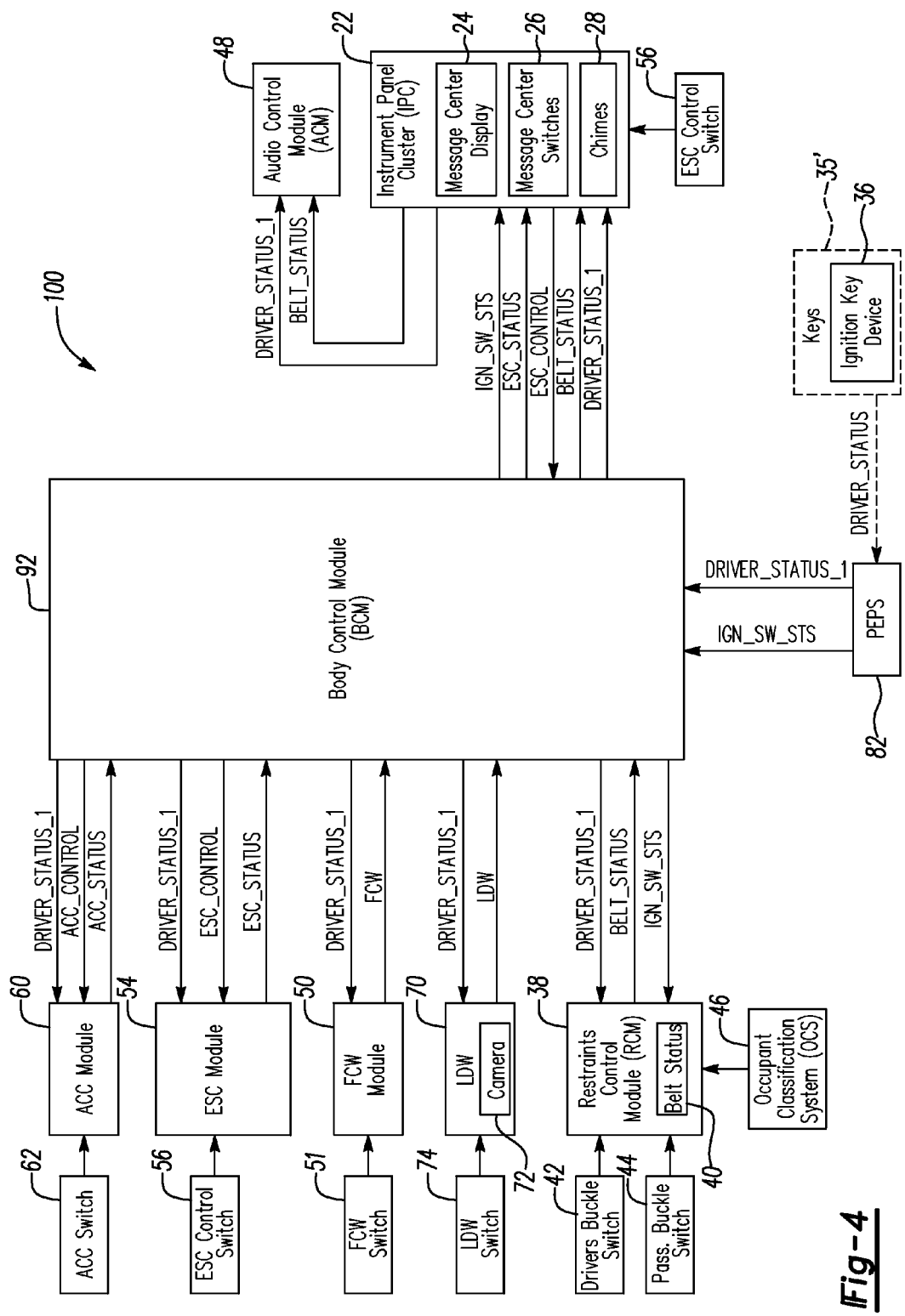
FIG. 4 depicts another system for differentiating between primary and secondary drivers of a vehicle and for controlling the operation of various safety and notification features based on the status of the driver in accordance to another embodiment of the present invention.

FIG. 4 depicts another system 100 for differentiating between primary and secondary drivers of a vehicle and for controlling the operation of various safety and notification features based on the status of the driver in accordance to another embodiment of the present invention. The PEPS controller 82 may be operably coupled to the BCM 92. The PEPS controller 82 may transmit the signals IGN_SW_STS and DRIVER_STATUS to the BCM 92. While FIG. 4 generally illustrates that the PEPS controller 82 is positioned external to the BCM 92, the PEPS controller 82 may be integrated into the BCM 92 or any other controller (or module) shown. The particular placement of the PEPS controller 82 may vary to meet the desired criteria of a particular implementation. As noted in FIG. 3, the BCM 92 may be adapted to transmit the signal DRIVER_STATUS_1 to the cluster 22, the restraint control module 38, the seatbelt status controller 40, the audio control module 48, the ESC module 54, and/or ACC module 60. The cluster 22 inhibits or restricts ACC operating parameter changes, FCW disable, ESC disable, LDW disable and provides for the early low fuel warning (or low battery charge warning) in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 5:
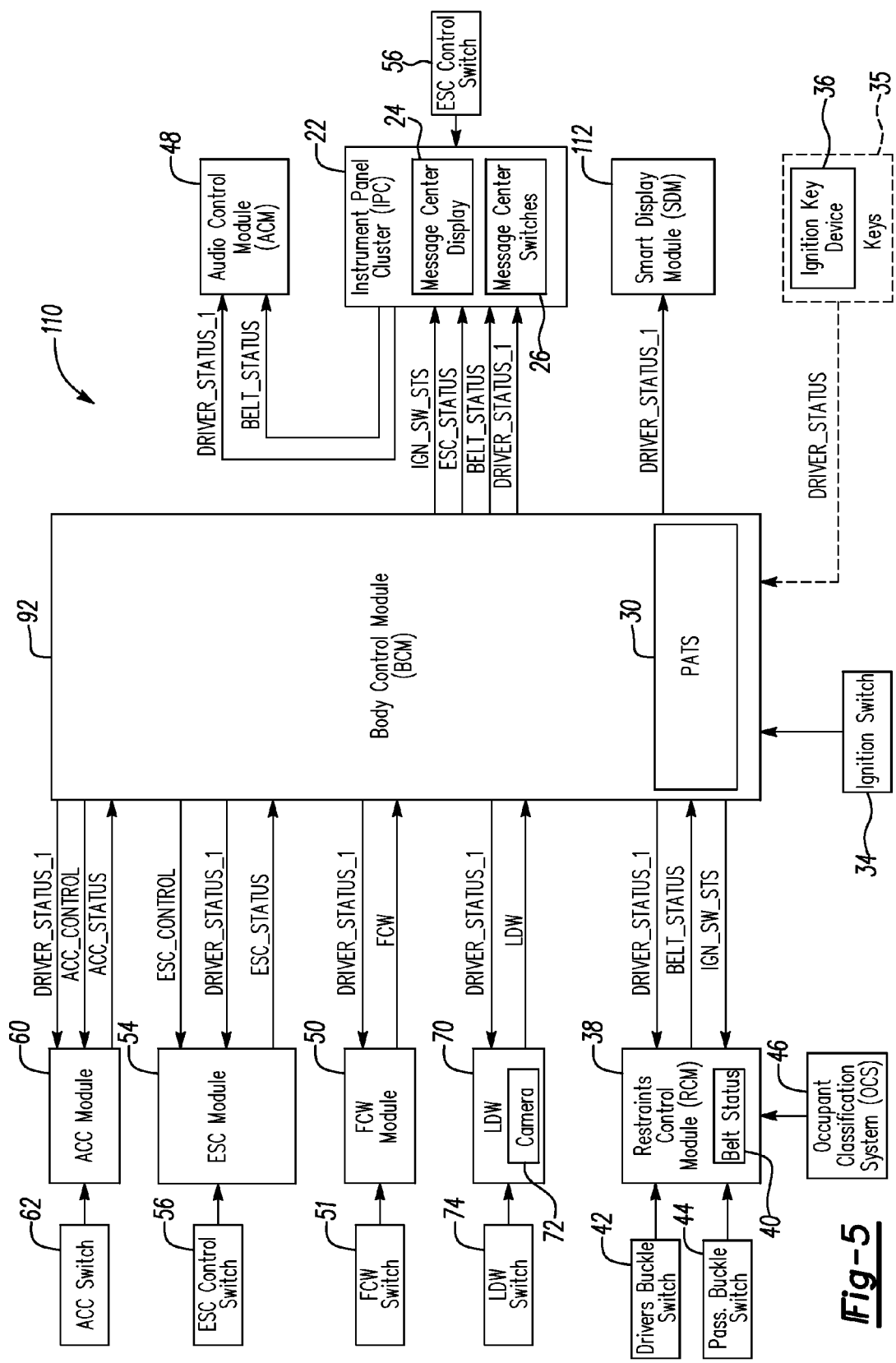
FIG. 5 depicts another system for differentiating between primary and secondary drivers of a vehicle and for controlling the operation of various safety and notification features based on the status of the driver in accordance to another embodiment of the present invention.

FIG. 5 depicts another system 110 for differentiating between primary and secondary drivers of a vehicle and for controlling the operation of various safety and notification features based on the status of the driver in accordance to another embodiment of the present invention. A smart display module 112 may be operably coupled to the cluster 22 and the BCM 92. The smart display module (SDM) 112 may be implemented as a monitor having a screen. The SDM 112 may visually present messages to the driver. In addition, a driver may touch different fields on the screen of the SDM 112 to select options for different vehicle related features. In one example, the message center switches 26 of the cluster 22 may be replaced by the SDM 112. The SDM 112 may be implemented separately from the cluster 22. The SDM 112 may be packaged in a center stack area of the instrument panel above the audio control module 48 and a climate control module (not shown). The SDM 112 may provide and is not limited to the following: allowing the driver to enable/disable default and configurable settings such as enabling/disabling the seatbelt status, enabling/disabling/adjusting one or more of the ACC operating parameters, enabling/disabling one or more of the ESC features, and enabling/disabling the LDW feature. While not shown, the SDM 112 may transmit control signals (not shown) to the seatbelt status controller 40, and the ESC module 54. The SDM 112 may also allow the driver to select various administrative menu options and save administrative settings which relate to the driver status functionality. The SDM 112 may not require for the user to have to toggle through a plurality of options to select a particular option as may be necessary with the message center switches 26 of the message center. The SDM 112 may also display a driver status message during vehicle start up and a seatbelt warning message. In one example, the SDM 112 may be configured to display any messages traditionally displayed by the message center display 24. In another example, the message center display 24 may be implemented along with the SDM 112.

The BCM 92 may provide the signal DRIVER_STATUS_1 to the SDM 112. In the event the signal DRIVER_STATUS_1 corresponds to the primary driver, the cluster 22 and/or the SDM 112 may allow the primary driver to enable/disable/adjust ACC, ESC, FCW, and LDW. The cluster 22 may use the signal DRIVER_STATUS_1 to maintain the normal low fuel warning strategy (or normal low battery charge warning) in the event the signal DRIVER_STATUS_1 corresponds to the primary driver. In the event the signal DRIVER_STATUS_1 corresponds to the secondary driver, the SDM 112 may not allow the secondary driver to inhibit the seatbelt status disable, TC disable, ESC disable, make ACC operating parameter changes, FCW disable, and LDW disable or other safety or notification feature disable. The cluster 22 may change the strategy with respect to issuing the low fuel warning strategy (or low battery charge warning) at an earlier point in time if the signal DRIVER_STATUS corresponds to the secondary driver.

Figure 6:
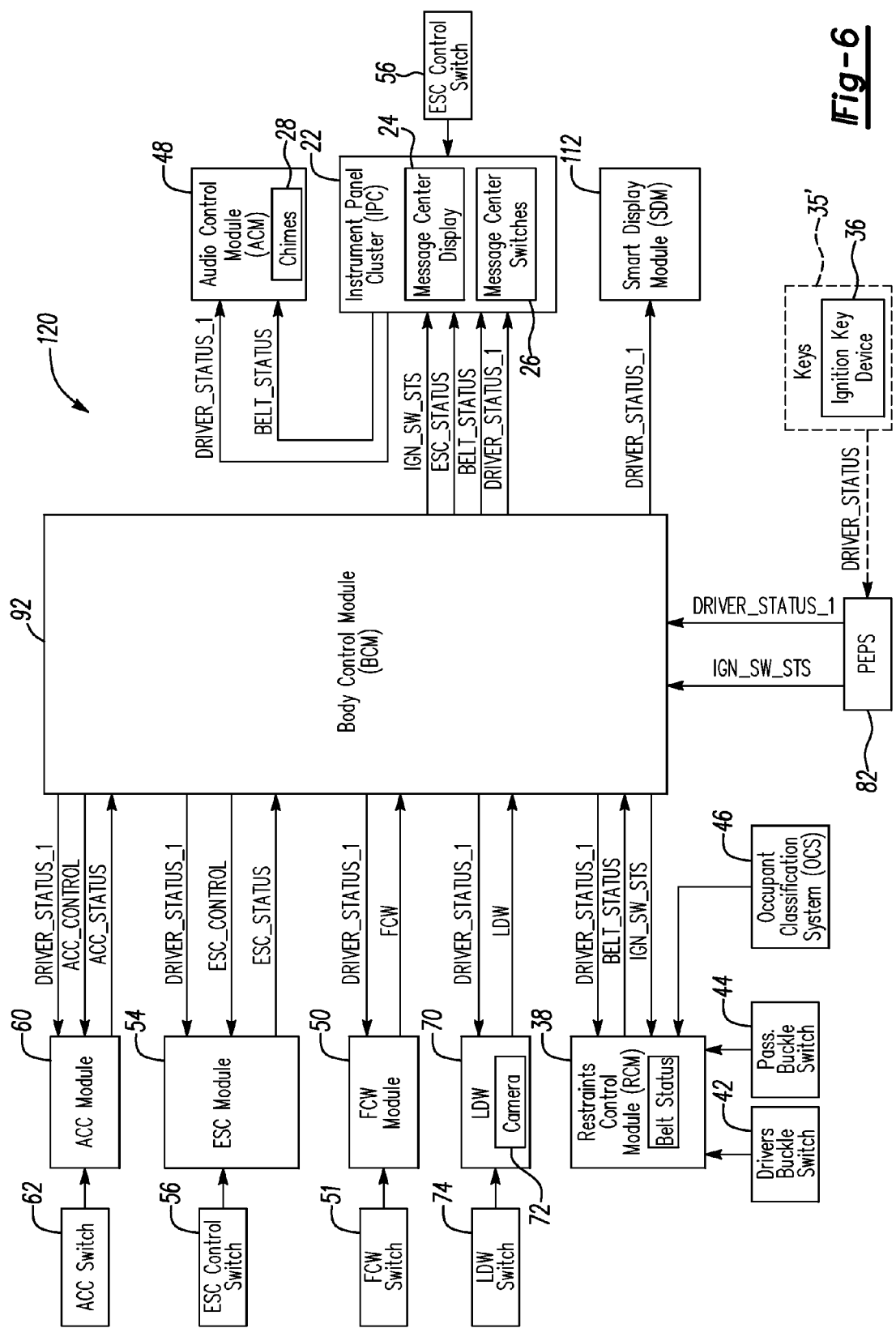
FIG. 6 depicts another system for differentiating between primary and secondary drivers of a vehicle and for controlling the operation of various safety and notification features based on the status of the driver in accordance to another embodiment of the present invention.

FIG. 6 depicts another system 120 for differentiating between primary and secondary drivers of a vehicle and for controlling the operation of various safety and notification features based on the status of the driver in accordance to another embodiment of the present invention. The system 120 is similar to the system 110 with the exception of the PEPS controller 82 being implemented in place of the PATS controller 30. While FIG. 6 generally illustrates that the PEPS controller 82 is implemented as a standalone controller, the PEPS controller 82 may be implemented into any of the controllers or modules shown.

The PEPS controller 82 may determine the driver status in response to the signal DRIVER_STATUS transmitted from the ignition key device 36 and transmit the signal DRIVER_STATUS_1 to the BCM 92. The BCM 92 transmits the signal DRIVER_STATUS_1 to the SDM 112. The SDM 112 and/or the cluster 22 may allow the primary driver to enable/disable/adjust ACC, ESC, FCW, LDW or other safety or notification feature. The cluster 22 may use the DRIVER_STATUS_1 to maintain the normal low fuel warning strategy (or low battery charge warning) in the event the signal DRIVER_STATUS_1 corresponds to the primary driver. In the event the signal DRIVER_STATUS_1 corresponds to the secondary driver, the SDM 112 may not allow the secondary driver to inhibit the seatbelt status disable, make restricted changes to ACC operating parameters, ESC disable, FCW disable, LDW or other safety or notification related feature. In addition, the cluster 22 may change the strategy with respect to issuing the low fuel warning strategy (or low battery charge warning) at an earlier point in time if the signal DRIVER_STATUS corresponds to the secondary driver.

Figure 7:
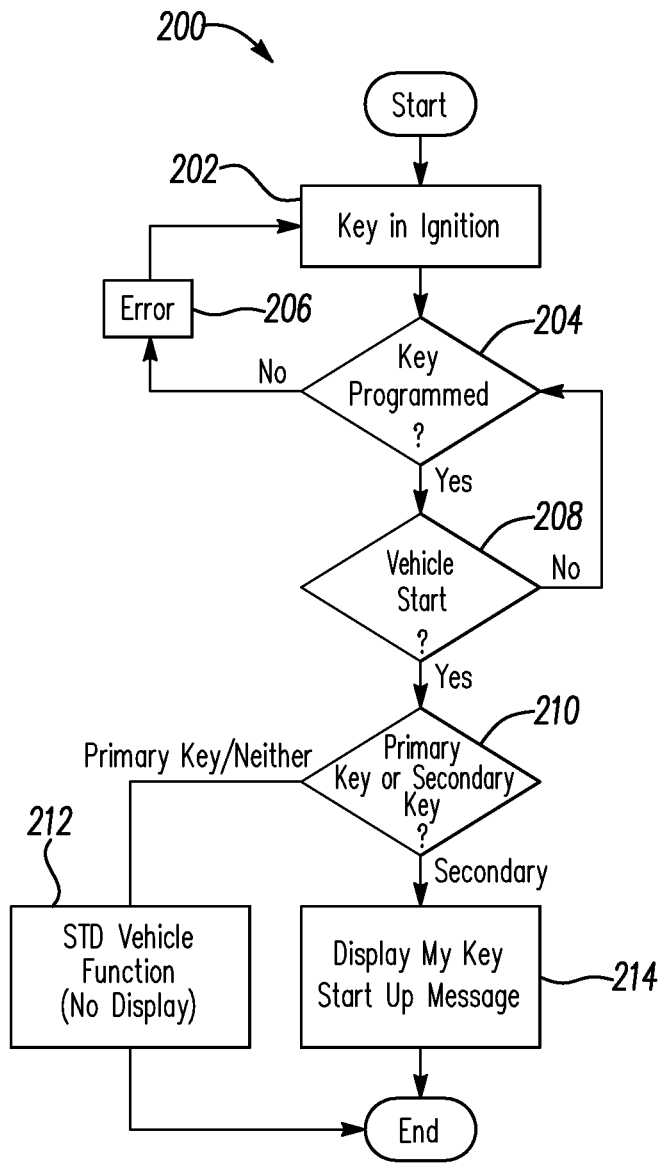
FIG. 7 depicts a block diagram for displaying a message for notifying drivers when the vehicle is in a driver identification mode.

FIG. 7 depicts a block diagram 200 for displaying a message to notify drivers of the driver status mode. In block 202, the driver inserts the key into the ignition. For systems 20, 90 and 110, the key ignition switch 34 transmits the signal IGN_SW_STS to the SPDJB 32 or the BCM 92 (see FIGS. 1, 3, and 5). The BCM 92 transmits a message of the signal IGN_SW_STS over the communication bus. For systems 80, 100 and 120, the PEPS controller 82 transmits the signal IGN_SW_STS over the communication bus to the various controllers or modules (see FIGS. 2, 4, and 6).

In block 204, the keys are monitored to determine if the keys were programmed. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or secondary driver. In the event the keys are not properly programmed to start the vehicle, then the diagram 200 moves to block 206. In the event the keys are properly programmed to start the vehicle, then the diagram 200 moves to block 208.

In block 206, an error is detected. The PATS controller 30 or the PEPS controller 82 determines an error and may not allow the driver to start the vehicle.

In block 208, a vehicle start is monitored. For the systems 20, 90 and 110, the SPDJB 32 or the BCM 92 determines whether the ignition switch 34 is in the start position. For systems 80, 100 and 120, the PEPS controller 82 determines whether the vehicle is started. If the vehicle is started, then the diagram 200 moves to block 210. If the vehicle has not been started, then the diagram moves back to block 204.

In block 210, the cluster 22 determines if the key was programmed as a primary key for the primary driver or if the key was programmed as a secondary key for the secondary driver. If the key is determined to be a primary key, then the diagram 200 moves to block 212. If the key is determined to be a secondary key, then the diagram 200 moves to block 214. In the event the key is not programmed as a primary or secondary key, the diagram 200 moves to block 212.

In block 212, the vehicle resumes standard vehicle function and no display regarding driver status is presented to the driver.

In block 214, a driver status message is presented to the driver. For systems 20, 80, 90 and 100, the message center display 24 of the cluster 22 displays the driver status message to the primary or secondary drivers. For systems 110 and 120, the SDM 112 displays the driver status startup message to the primary or secondary drivers. In general, the driver status message may be useful in the situation whereby the primary driver accidentally uses the secondary key to start the vehicle. In such an example, a driver status message may be presented thereby notifying the primary driver that the vehicle may have limited override capability with respect to enabling and disabling the safety and notification features of the vehicle.

Figure 8:
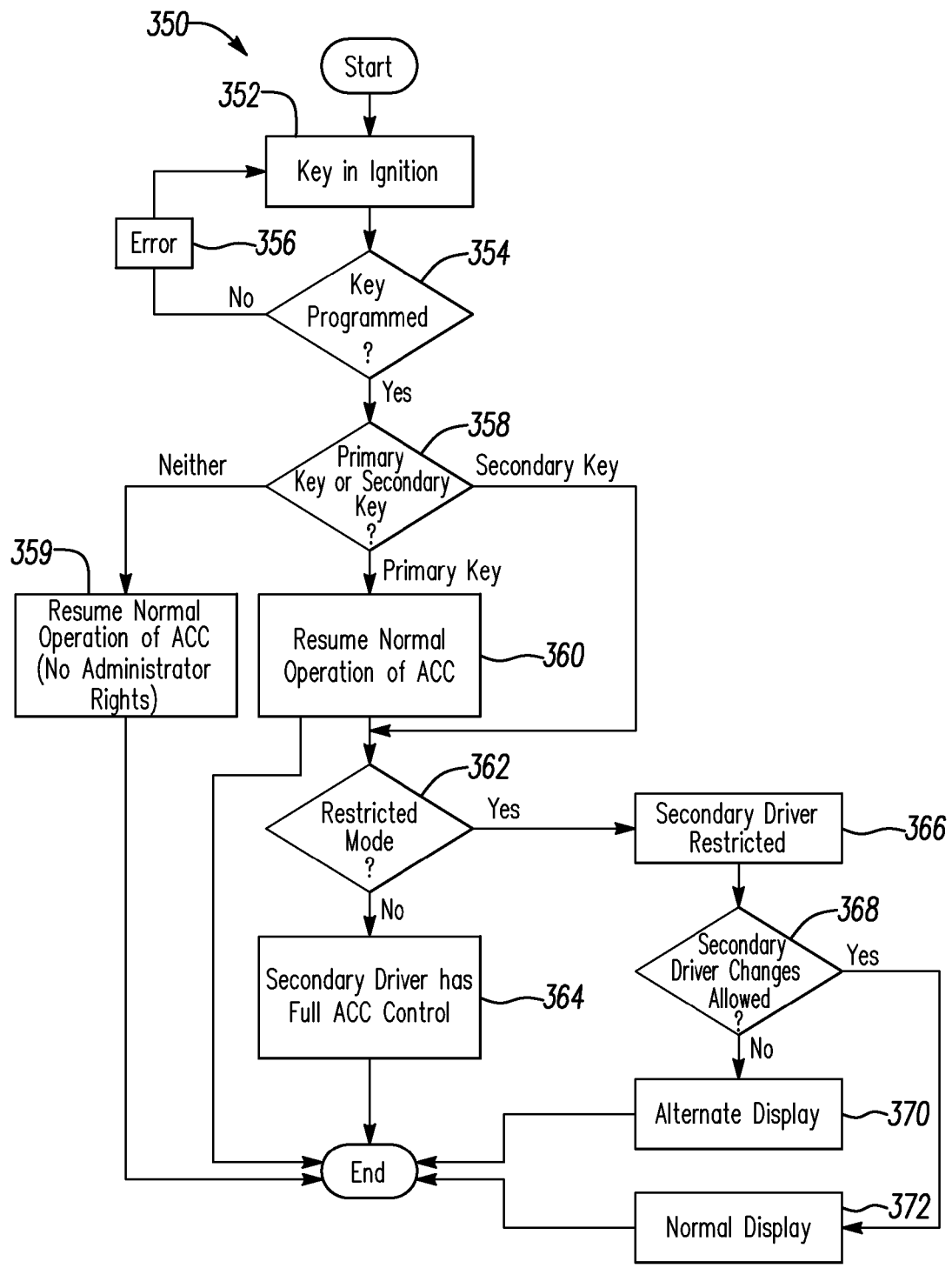
FIG. 8 depicts a block diagram for instituting a restricted mode in which changing operating parameters of an ACC system is inhibited based on the status of the driver.

FIG. 8 depicts a block diagram 350 for setting an ACC restricted mode and for changing operating parameters of an ACC system based on the status of the driver. In block 352, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 of the BCM 92 transmits a message of the signal IGN_SW_STS over the communication bus. For systems 80, 100 and 110, the PEPS controller 82 transmits the signal IGN_SW_STS over the communication bus to the various controllers or modules (see FIGS. 2, 4, and 6).

In block 354, the keys are monitored to determine if the keys were programmed to start the vehicle. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or the secondary driver. In the event the keys are not programmed or valid to start the vehicle, then the diagram 350 moves to block 356. In the event keys are properly programmed, then the diagram 350 moves to block 358.

In block 356, an error is detected. The PATS controller 30 or the PEPS controller 82 determines an error and may not allow the driver to start the vehicle in the event the keys are not properly programmed to the vehicle.

In block 358, the cluster 22 or the ESC module 54 determines if the key was programmed as a primary key for the primary driver or if the key was programmed as a secondary key for the secondary driver. If the key is determined to be the primary key, then the diagram 350 moves to the block 360. If the key is determined to be the secondary key, then the diagram 350 moves to the block 362. If the key is determined not to be tagged to or programmed to either driver, then the diagram 350 moves to the block 359.

In block 359, the vehicle resumes normal operation and allows the driver to change operating parameters of the ACC function. The driver in this case has no administrative rights since the driver is not recognized as a primary or secondary driver.

In block 360, the primary driver may enable/disable the ACC function entirely and/or change any one or more of the other ACC operating parameters (e.g. MFD, MAS, and/or ATI) via the ACC control switch 62 or the message center switch 26. It may be generally assumed that the ACC feature defaults to enabled or "ON" for each new ignition cycle. For systems 20 and 80, in the event the ACC control switch 62 is coupled to the cluster 22, the cluster 22 processes the data from the ACC control switch 62 and sends out the signal ACC_CONTROL to the ACC module 60. The ACC module 60 changes ACC operating parameters in response to the signal ACC_CONTROL. In the event the ACC control switch 62 is coupled directly to the ACC module 60, the ACC module 60 processes information received from the ACC control switch 62 and enables control of one or more of the ACC operating parameters in response to the ACC control switch 62.

For systems 90, 100, 110 and 120, the operation is similar to systems 20 and 80 with the exception that the BCM 92 may transmit/receive the signals ACC_CONTROL and/or ACC_STATUS to/from the cluster 22 and the ACC module 60. In the event the vehicle does not include the ACC switch, the message center switch 26 may be used to control the ACC operating parameters. The cluster 22 transmits the signal ACC_CONTROL to the ACC module 60.

In block 362, the cluster 22 allows the primary driver to set the ACC system to a restricted mode in which the secondary driver is partially or completely prevented from resetting or adjusting certain of the operating parameters of the ACC function. In the event the primary driver elects to allow the secondary driver full control over the ACC operating parameters, then the diagram 350 moves to block 364. In the event the primary driver elects to restrict control by the secondary driver over one or more of the ACC operating parameters, the primary driver selects the extent of those restrictions (as described hereinabove), then the diagram moves to block 366. For example, the primary driver may via the cluster 22 or the SDM 112 select an option for preventing the secondary driver from disabling the ACC and from selecting a MFD shorter than a desired distance.

In block 364, the secondary driver has full, unrestricted control over all operating parameters of the ACC and may make any desired adjustments.

In block 366, the ACC is in a restricted mode in which the secondary driver is prevented from changing or adjusting one or more operating parameters of the ACC, depending on the restrictions established by the primary driver when entering the restricted mode at block 362. For example, the primary driver may allow the secondary driver the option of increasing the MFD to a distance above a certain base distance selected by the primary driver. In another example, the secondary driver may be permitted to disable the automatic speed control so that there are no powertrain interventions, but may not be permitted to disable the audible warning when the MFD has been violated In block 368, the cluster 22 or the SDM 112 determines if the secondary driver attempts to change ACC operating parameters via the ACC control switch 62. In the event the cluster 22 or the SDM 112 determines that the secondary driver has attempted to make a restricted (non-permitted) change in operating parameters via the ACC control switch 62, the diagram 350 moves to block 370. In the event the secondary driver does not attempt to make a non-permitted change in operating parameters, the diagram 350 moves to block 372.

In block 370, the cluster 22 or the SDM 112 transmits an ACC driver status message informing the secondary driver that the restricted mode is in effect and that the directed change in operating parameters has not been permitted. The message may be in the form of a telltale on the cluster 22 or a message displayed via the message center display 24 or in the SDM 112.

In block 372, no alternate driver status message is necessary since the secondary driver has not attempted to adjust or change the ACC operating parameters in contravention of the restrictions that are in place.

In general, the embodiments described herein differentiate between primary and secondary drivers so that the secondary driver may have less control over a particular safety and notification related feature than the primary driver. The embodiments of the present invention allow primary drivers to prevent secondary drivers from disabling safety and/or notification related features on the vehicle.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling operation of an adaptive cruise control, the system comprising:
   a first ignition key device positioned on a primary key for transmitting a first driver status signal indicating that the driver is a primary driver;
   a second ignition key device positioned on a secondary key for transmitting a second driver status signal indicating that the driver is a secondary driver; and
   at least one controller communicating with the first ignition key device and the second ignition key device and configured to:

receive the first driver status signal;

receive a command via a user interface from the primary driver including a base value of a minimum following distance of the adaptive cruise control; and in response to subsequently receiving the second driver status signal, prevent changing of the minimum following distance to a value below the base value.

2. The system of claim 1 wherein the at least one controller includes a passive entry passive start controller configured to receive the first driver status signal from the primary key and the second driver status signal from the secondary key.

3. The system of claim 1 wherein each of the first ignition key device and the second ignition key device includes a radio frequency (RF) based transponder for transmitting each of the first driver status signal and the second driver status signal as an RF based signal.

4. The system of claim 1 wherein the at least one controller is further configured to receive the driver status signal via a communication bus.

5. The system of claim 1 wherein the at least one controller is further configured to wirelessly receive the driver status signal.

6. A device for controlling operation of an adaptive cruise control system of a motor vehicle comprising:

a controller configured to:

receive a driver status signal indicative of the driver being one of a primary driver and a secondary driver;

determine that the driver of the vehicle is the primary driver based on the driver status signal;

receive a command from the primary driver to operate the adaptive cruise control system in a restricted mode and including a base value of a minimum following distance; and upon subsequent receipt by the controller of the driver status signal indicating that the secondary driver is the driver of the vehicle, prevent the secondary driver from changing the minimum following distance to a setting below the base value.

7. The device of claim 6 wherein the controller is further configured to receive the driver status signal via a communication bus.

8. The device of claim 6 wherein the controller is further configured to wirelessly receive the driver status signal.

9. The device of claim 6 wherein the controller comprises a passive entry passive start controller configured to receive the driver status signal.

10. The device of claim 6 wherein the controller is configured to receive the driver status signal from a radio frequency based transponder.

* * * * *